United States Patent
Zhang et al.

(10) Patent No.: US 10,598,340 B2
(45) Date of Patent: Mar. 24, 2020

(54) LED LAMP LIGHT DISTRIBUTION SYSTEM AND ILLUMINATION SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Fawei Zhang, Zhejiang (CN); Bozhang Xu, Zhejiang (CN); Zuping He, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/146,115

(22) Filed: Sep. 28, 2018

(65) Prior Publication Data

US 2019/0113205 A1  Apr. 18, 2019

(30) Foreign Application Priority Data

Oct. 18, 2017  (CN) .......................... 2017 1 0969603

(51) Int. Cl.
*F21V 5/04* (2006.01)
*F21V 19/00* (2006.01)
(Continued)

(52) U.S. Cl.
CPC .............. *F21V 5/04* (2013.01); *F21V 7/0025* (2013.01); *F21V 13/04* (2013.01);
(Continued)

(58) Field of Classification Search
CPC .......... F21V 5/04; F21V 19/0015; F21V 7/00; G02B 5/02
See application file for complete search history.

(56) References Cited

U.S. PATENT DOCUMENTS 6,005,703 A * 12/1999 Maddox ............... G02B 26/124
  359/205.1
7,339,200 B2 * 3/2008 Amano .................... G02B 3/02
  257/98
(Continued)

FOREIGN PATENT DOCUMENTS

CN  107084340 A * 8/2017 .............. F21V 13/04

OTHER PUBLICATIONS

Zhang, Chinese Patent Application, CN107084340A, Aug. 2017 foreign translation (Year: 2017).*

*Primary Examiner* — Tracie Y Green
(74) *Attorney, Agent, or Firm* — Wang Law Firm, Inc.

(57) ABSTRACT

An LED lamp light distribution system and illumination system, the illumination system comprises an LED lamp light distribution system, and at least one illuminated surface. The LED lamp light distribution system comprises an LED chip, a lens, and a light reflecting device. The lens comprises a lens optical axis, a light source setting groove, and an exit surface. The light source setting groove comprises a first contour line, and the exit surface comprises a first exit surface contour line. The first contour line and the first exit surface contour line complete the convergence of the emergent light of the LED chip toward the lens optical axis. The light source setting groove comprises a second contour line, the exit surface comprises a second exit surface contour line, and the second contour line and the second exit surface contour line complete the diffusion of the emergent light of the LED chip away from the lens optical axis. The illuminated surface is perpendicular to the reflecting plate and the lens optical axis. The illumination system can provide users with specific lighting effects to meet the needs of users.

16 Claims, 4 Drawing Sheets

(51) Int. Cl.
  *F21V 7/00* (2006.01)
  *G02B 5/02* (2006.01)
  *F21V 13/04* (2006.01)
  *G02B 19/00* (2006.01)
  *F21Y 115/10* (2016.01)

(52) U.S. Cl.
  CPC ........ *F21V 19/0015* (2013.01); *G02B 5/0205* (2013.01); *G02B 19/0014* (2013.01); *G02B 19/0061* (2013.01); *F21Y 2115/10* (2016.08)

(56) References Cited

U.S. PATENT DOCUMENTS

| | | | |
|---|---|---|---|
| 7,499,228 B2* | 3/2009 | Jeong | G02F 1/133603 359/642 |
| 9,116,386 B2* | 8/2015 | Ha | G02F 1/133603 |
| 10,036,842 B2* | 7/2018 | Sakuragi | G02B 6/001 |
| 2002/0085390 A1* | 7/2002 | Kiyomoto | B60Q 1/302 362/555 |
| 2005/0212089 A1* | 9/2005 | Kiyomoto | H01L 33/60 257/601 |
| 2018/0335198 A1* | 11/2018 | He | F21V 13/04 |
| 2019/0162402 A1* | 5/2019 | Ji | F21V 7/005 |

\* cited by examiner

LED LAMP LIGHT DISTRIBUTION SYSTEM AND ILLUMINATION SYSTEM

CROSS-REFERENCE TO A RELATED APPLICATION

This application claims priority to a Chinese Patent Application No. CN 201710969603.6, filed on Oct. 18, 2017.

FIELD OF THE TECHNOLOGY

The present invention relates to lighting system, with particular emphasis on LED light distribution system and illumination system capable of providing specific illumination effects.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As mentioned above, the use of light-emitting diodes as light-emitting sources has the advantages of power saving and greater brightness, so it has gradually become common in use.

With the development of lighting technology, people are increasingly demanding light sources, such as the size of the spot, the direction of the light, and even the illuminance, chromaticity, and lumen value of the light. Especially in some wall washers, people are very eager to have spots of a specific shape, such as squares, such as rectangles. However, for some spotlights such as downlights, it is often difficult to achieve a square spot.

SUMMARY OF THE INVENTION

Therefore, it is necessary to provide a LED light distribution system and illumination system capable of providing specific illumination effects to overcome the above disadvantages.

An LED lamp light distribution system comprises an LED chip, a lens disposed in a light emitting direction of the LED chip, and a light reflecting device disposed in the light emitting direction of the lens, the LED chip comprises a chip optical axis, the lens comprises a lens optical axis disposed coincident with the chip optical axis, and a light source setting groove intersecting the lens optical axis, and an exit surface for receiving the outgoing light of the light source setting groove, the light source setting groove is a plane symmetrical structure, in a section along the lens optical axis and parallel to the horizontal plane, the light source setting groove comprises a first contour line, and the exit surface comprises a first exit surface contour line, the first contour line and the first exit surface contour line complete the convergence of the outgoing light of the LED chip toward the lens optical axis, on a section along the lens optical axis and perpendicular to the horizontal plane, the light source setting groove comprises a second contour line, the exit surface including a second exit surface contour line, the second contour line and the second exit surface contour line complete diffusion of the outgoing light of the LED chip away from the lens optical axis, the light reflecting device comprises a reflecting plate perpendicular to a plane formed by the second contour line and the second exit surface contour line.

Advantageously, the curvature of the first exit surface contour line is greater than the curvature of the first contour line.

Advantageously, the curvature of the second exit surface contour line is smaller than the curvature of the first contour line.

Advantageously, on a section along the lens optical axis and parallel to the horizontal plane, the second exit surface contour line comprises two curved line and an intersection line formed by the intersection of the two curved lines and intersecting the lens optical axis, this intersection line is parallel to the horizontal plane.

Advantageously, the lens takes the plane where the intersection line and the lens optical axis are located as a symmetric plane.

Advantageously, the lens takes the plane perpendicular to the intersection line and the lens optical axis as a symmetric plane.

Advantageously, on the second exit surface contour line, the diffusion angle of the second exit surface contour line gradually decreases in the direction away from the intersection line so that the light obtained in the direction away from the intersection line gradually increases.

A illumination system comprises the LED lamp light distribution system as described above and at least one illuminated surface corresponding to the LED lamp light distribution system respectively, the illuminated surface perpendicular to the reflecting plate and the lens optical axis, on a section along the lens optical axis and parallel to the horizontal plane, the second exit surface contour line comprises two curved line and an intersection line formed by the intersection of the two curved lines and intersecting the lens optical axis, the intersection line is parallel to the horizontal plane, the boundary is the intersection line, and on a section along the lens optical axis and parallel to the horizontal plane, the emergent light of the second exit surface contour line close to the side of the reflecting plate is directed toward the reflecting plate, the reflected light of the reflecting plate overlaps with the light spot formed by the emergent light of the second exit surface contour line away from the side of the reflecting plate on the illuminated surface.

Advantageously, on the second exit surface contour line, the diffusion angle of the second exit surface contour line gradually decreases in the direction away from the intersection line so that the light obtained in the direction away from the intersection line gradually increases.

Advantageously, the side with the smaller diffusion angle is directed toward the side of the lens that is farthest from the illuminated surface.

Compared with the prior art, via the structural design of the contour lines of the exit surface of the lens and the light source setting groove in two directions of perpendicular to the horizontal plane X and parallel to the horizontal plane X, and under the action of the reflecting plate, the spot formed by the emergent light of the lens on the illuminated surface will be substantially a rectangular spot, so that the user can be provided with a specific lighting effect to meet the needs of the user.

DETAILED DESCRIPTION OF THE DRAWINGS

The drawings described herein are intended to promote a further understanding of the present invention, as follows.

DESCRIPTION OF THE PREFERRED EMBODIMENTS

Figure 1:
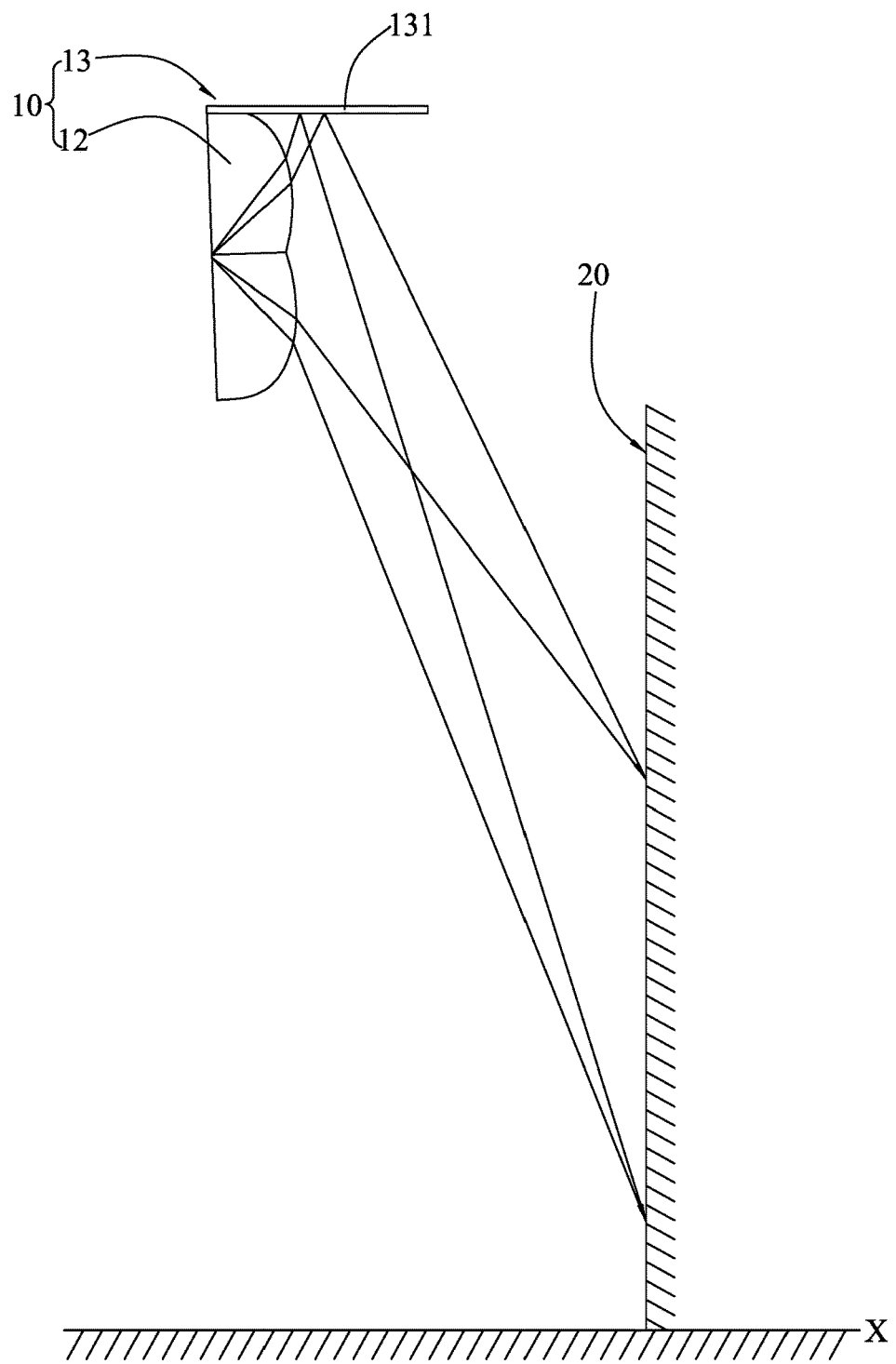
FIG. 1 is a schematic view showing the structure and optical path of an illumination system provided by the present invention.

The present application is illustrated by way of the following detailed description based on of the accompanying drawings. It should be noted that illustration to the embodiment in this application is not intended to limit the invention.

Please refer to FIG. 1 to FIG. 4, which are schematic structural diagrams of a illumination system 100 according to the present invention. The illumination system 100 comprises an LED lamp light distribution system 10 and an illuminated surface 20 corresponding to the LED lamp light distribution system 10. In practical applications, the LED lamp light distribution system 10 may comprise a plurality of, which may be determined according to the size or how much of the illuminated surface 20. In the present embodiment, only an LED lamp light distribution system 10 and an illuminated surface 20 corresponding to the LED lamp light distribution system 10 are shown only for the detailed description of the present invention. It is conceivable that the illumination system 100 further comprises other components, such as a cabinet, a mounting, etc., and a lamp holder, a lamp cover and the like for setting the LED lamp light distribution system 10, and a power supply for supplying power to the LED module. Etc., because components such as these are not the focus of the present invention and will not be described again here.

The LED lamp light distribution system 10 comprises an LED chip 11, a lens 12 disposed in the light emitting direction of the LED chip 11, and a light reflecting device 13 disposed in the light emitting direction of the lens 12.

The LED chip 11 comprises a chip optical axis 111. It should be understood by those skilled in the art that any source should have an optical axis that can be the guide for optical design. For the structure and working principle of the LED chip 11 itself, it should be a prior art, and details are not described herein again. It should be explained that the illumination effect of the LED chip 11. The LED chip 11 approximates a point source, but the light emitted by the LED chip is not a sphere but a hemisphere, that is, the angle of illumination is 180 degrees in any section along the optical axis. Therefore, if the emitted light of the LED chip 11 is not regulated, the spot formed by the LED chip 11 will not be presented according to the needs of the user. If the chip optical axis of the LED chip 11 is perpendicular to the illuminated surface 20, it will form a circular spot. If it is not perpendicular to the illuminated surface 20, a fan-shaped spot is formed, and the middle is bright and the edges are dark.

The lens 12 is configured to regulate an exit path of the emitting light of the LED chip 11 to form a spot desired by a user, and comprises a lens optical axis 121 disposed coincident with the chip optical axis 111, and a light source setting groove 122 intersecting the lens optical axis 121, and an exit surface 123 for receiving the outgoing light of the light source setting groove 122. It is conceivable that the lens 12 also comprises other functional structures such as a lens mounting structure and the like. It should be further clarified that in the installation of a lamp, especially for a lamp with a spot with a certain shape, the installation requires a reference object such as a vertical wall or a horizontal floor or ceiling. Therefore, in the present application, a horizontal plane X is used as a reference surface or a reference object. When the LED light fixture is installed, the horizontal plane X is used as a reference surface to obtain a spot of a specific effect regulated by the technical solution of the present application.

The lens optical axis 121 has the same function as the chip optical axis 111. Although it is a virtual line, it is indispensable in optical design, and it is also a guide for optical design. Therefore, in explaining the structure of the lens 12, the lens optical axis 121 and the horizontal plane are often used as a reference system, whereby the positional relationship of each functional element in the lens 12 is positioned.

The light source setting groove 122 is a plane symmetrical structure, It takes a plane along the lens optical axis 121 and perpendicular to the horizontal plane X as a symmetric plane, and also takes another plane of symmetry along the lens optical axis 11 and parallel to the horizontal plane X. Therefore, the lens optical axis 121 passes through the light source setting groove 122 while the lens optical axis 121 coincides with the chip optical axis 111, thereby determining the set position of the LED chip 11.

The exit surface 123 is configured to receive the emergent light of the light source setting groove 122, and according to design requirements, the emergent light is directed to a predetermined direction to achieve the purpose of forming a specific spot. Therefore, the shape of the exit surface 123 determines the direction in which the light is emitted. However, since the light emitting direction of the exit surface 123 is not only related to its own structure, but also related to the light source setting groove 122 and the light emitting direction of the LED chip 11, The shape of the specific spot to be formed by the technical solution of the present application will be described below in conjunction with the structure of the exit surface 123 and the light source setting groove 122, and the outgoing light characteristics of the LED chip 11.

Figure 2:
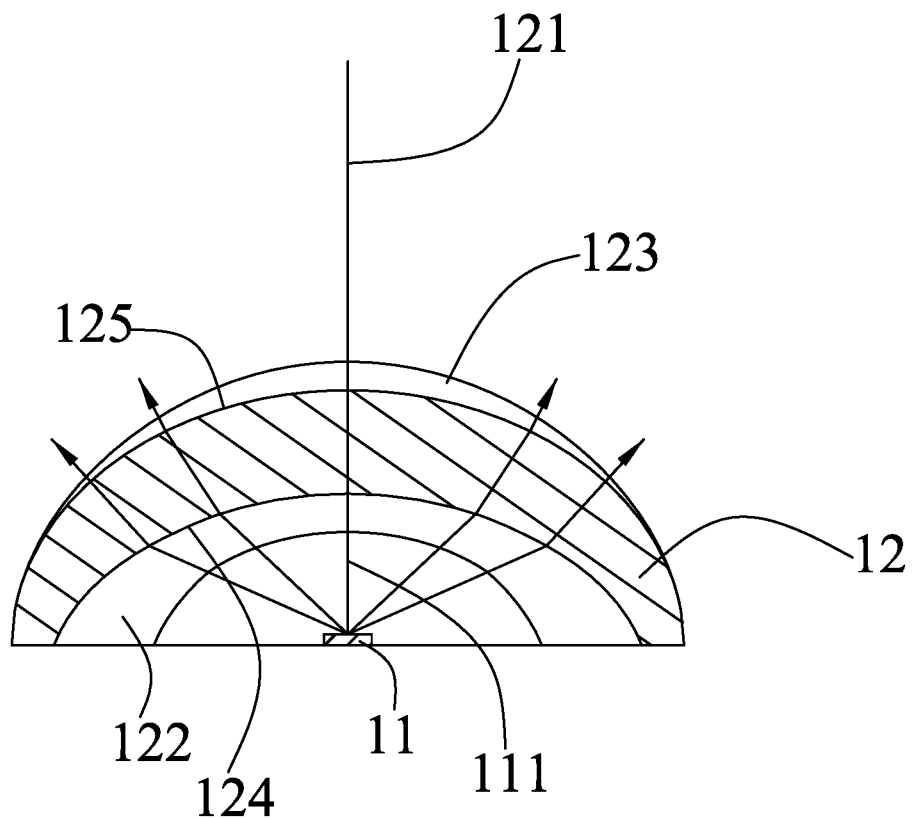
FIG. 2 is a structural schematic view of the lens of the illumination system of FIG. 1 in a section along the optical axis of the lens and parallel to a horizontal plane.
Figure 4:
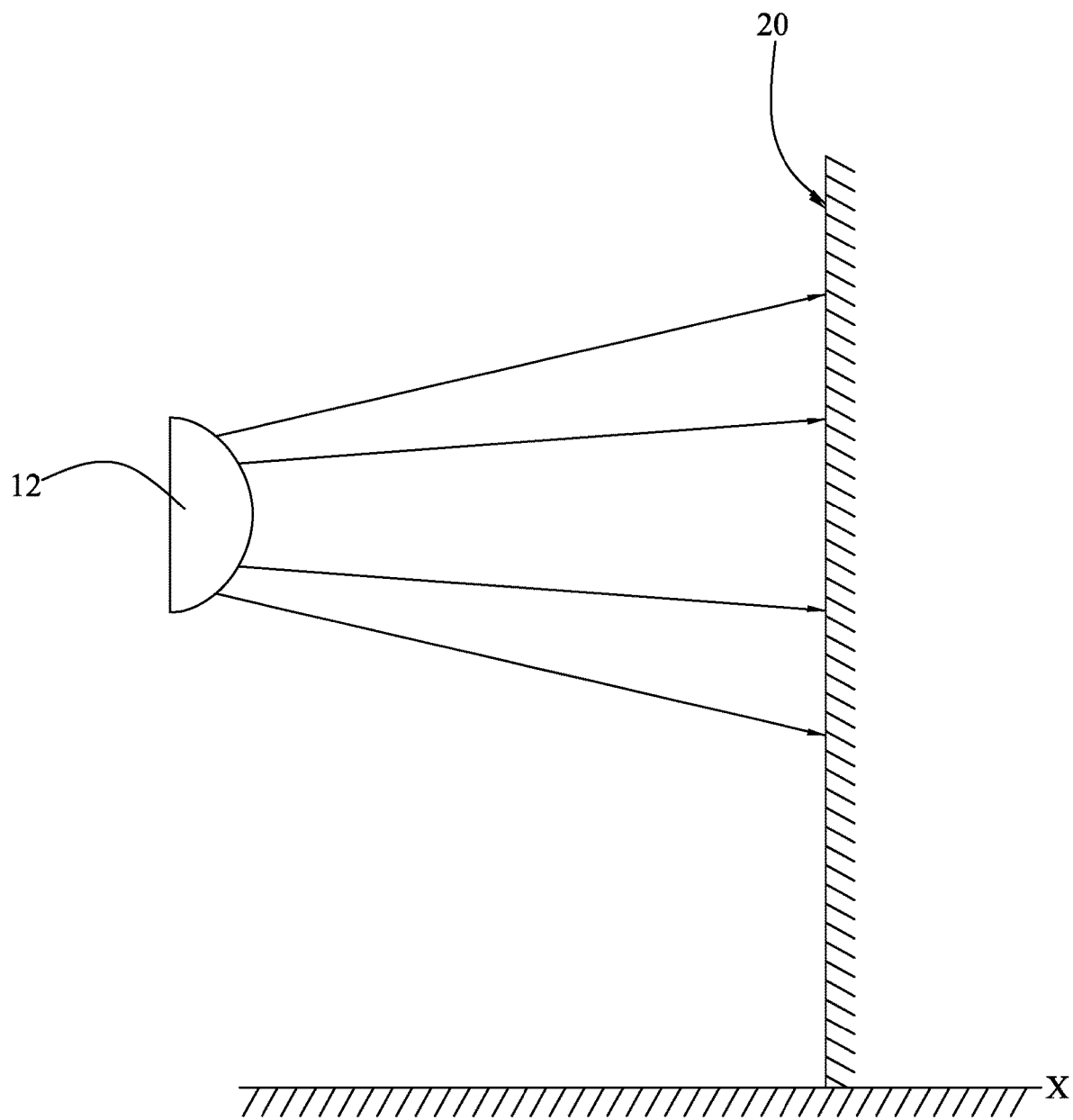
FIG. 4 is a schematic view of the optical path of the illumination system of FIG. 1 parallel to the horizontal plane.

As shown in FIGS. 2 and 4, in a section along the lens optical axis 121 and parallel to the horizontal plane X, the light source setting groove 122 comprises a first contour line 124, and the exit surface 123 comprises a first exit surface contour line 125. The first contour line 124 and the first exit surface contour line 125 complete the convergence of the outgoing light of the LED chip 11 toward the lens optical axis 121, so that the illumination range of the LED chip 11 is narrowed in a direction perpendicular to the horizontal plane X. To achieve this optical effect, the curvature of the first exit surface contour line 125 is greater than the curvature of the first contour line 124. It should be further noted that the FIG. 4 should be the top view of FIG. 1.

Figure 3:
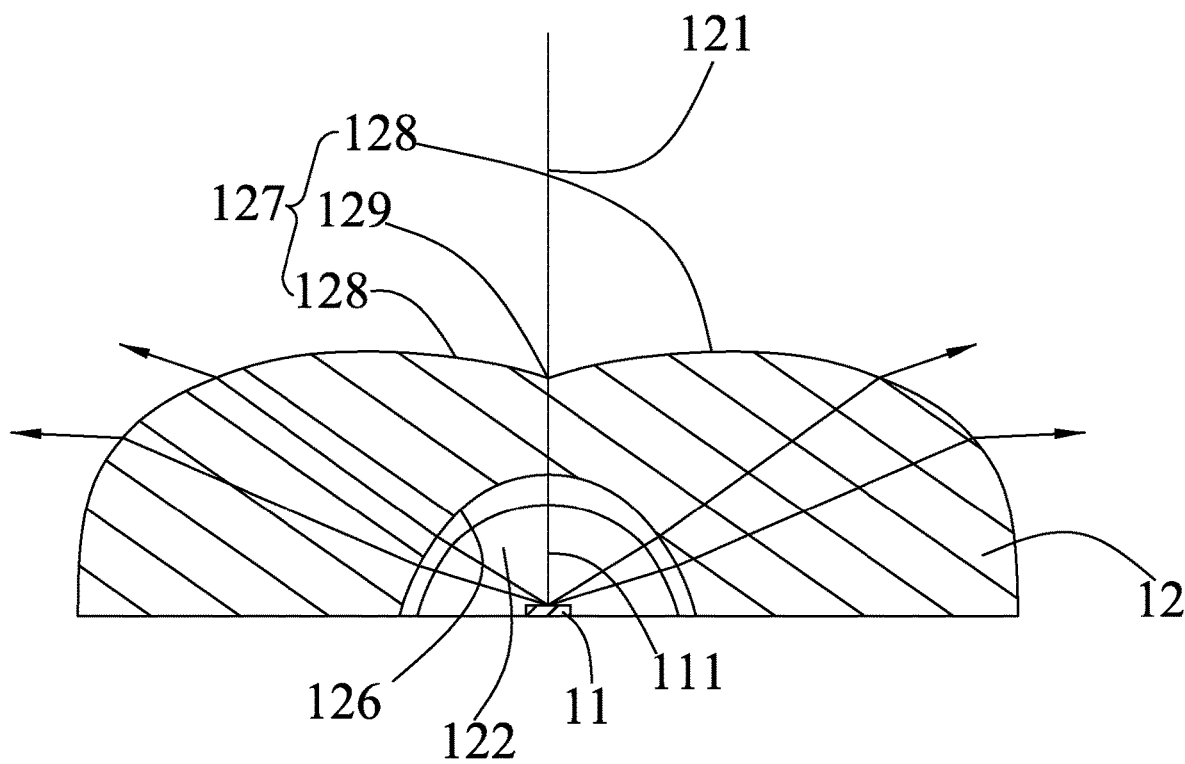
FIG. 3 is a structural schematic view of the lens of the illumination system of FIG. 1 in a section along the optical axis of the lens and perpendicular to a horizontal plane.

As shown in FIGS. 3 and 1, on a section along the lens optical axis 121 and perpendicular to the horizontal plane X, the light source setting groove 122 comprises a second contour line 126, the exit surface 123 including a second exit surface contour line 127. The second contour line 126 and the second exit surface contour line 127 complete diffusion of the outgoing light of the LED chip 11 away from the lens optical axis 121, such that the illumination range of the LED chip 11 will be lengthened in the direction perpendicular to the horizontal plane X. To achieve this optical effect, the curvature of the second exit surface contour line 127 is less than the curvature of the second contour line 126. In order to make the illumination range of the lens 12 longer in a direction parallel to the horizontal plane X, on a section along the lens optical axis 121 and parallel to the horizontal plane X, the second exit surface contour line 127 comprises two curved line 128 and an intersection line 129 formed by the intersection of the two curved lines 128 and intersecting the lens optical axis 121. This intersection line 129 is parallel to the horizontal plane X. Since the second exit surface contour line 127 comprises two curved lines 128, it can further increase the illumination range in a direction perpendicular to the horizontal plane X. Optically speaking, on the second exit surface contour line 127, the diffusion angle of each of the curved lines 128 gradually decreases in the direction away from the intersection line 129 so that the light obtained in the direction away from the intersection line 129 gradually increases. Because the smaller the diffusion angle is, the more the emitted light will be directed to the farther from the lens 12, that is, the side with the smaller diffusion angle is directed toward the side of the lens 12 that is farthest from the illuminated surface 20. Thus, the more light attenuation caused by the projection away from the lens 12 can be compensated.

Since the outgoing light of the LED chip 11 is a hemispherical shape, and the light source setting groove 122 is also a plane symmetrical structure, the exit surface 123 should also be a plane symmetrical structure. Specifically, the exit surface 123 is a symmetric plane parallel to the horizontal plane X with the plane of the intersection line 129 and the lens optical axis 121, and also takes the plane perpendicular to the intersection line 129 and the lens optical axis 121 as a symmetric plane perpendicular to the horizontal plane X.

The light reflecting device 13 comprises a reflecting plate 131. It is conceivable that the reflecting device 13 does not only comprise a reflecting plate 131, but it must also comprise other functional structures, such as assembly structures, even reflective films, etc., which should be known to those skilled in the art, not explained here. For the sake of simplicity, only one flat plate is shown in the diagram of the present embodiment. The reflecting plate 131 is parallel to the lens optical axis 121 and the horizontal plane X. The placement position of the reflecting plate 131 determines the shape of the spot that is finally obtained. When the LED lamp is mounted, the illuminated surface 20 should be perpendicular to the reflecting plate 131 and the lens optical axis 121, as well as the horizontal plane X. According to the positional relationship between the first and second contour lines 124, 126 of the lens 12, the second and second exit surface contour lines 125, 127 and the horizontal plane X, the position relation between the reflecting plate 131 and the lens 12 can be deduced. That is, the reflecting plate 131 is parallel to the first contour line 124 and the first exit surface contour line 127 and perpendicular to the second contour line 125 and the second exit surface contour line 127. Meanwhile, when the reflecting plate 131 is assembled, the boundary is the intersection line 129, and on a section along the lens optical axis 121 and perpendicular to the horizontal plane X, the emergent light of the second exit surface contour line 127 close to the side of the reflecting plate 131 is directed toward the reflecting plate 131, the reflected light of the reflecting plate 131 overlaps with the light spot formed by the emergent light of the second exit surface contour line 127 away from the side of the reflecting plate 131 on the illuminated surface 20.

The illuminated surface 20 is a position where the LED lamp light distribution system 10 is illuminated, and may be a flat surface or a curved surface. In the present embodiment, the present invention is merely exemplified, and the illuminated surface 20 is a flat surface. The illuminated surface 20 may be an item such as a picture to be illuminated in a museum, or may be a vending item in a freezer in a supermarket. When the LED lamp light distribution system 10 is installed, the reflecting plate 131 should be made parallel to the horizontal plane X, so that the illumination spot desired by the user can be obtained.

Compared with the prior art, via the structural design of the contour lines of the exit surface 123 of the lens 12 and the light source setting groove 122 in two directions of perpendicular to the horizontal plane X and parallel to the horizontal plane X, and under the action of the reflecting plate 131, the spot formed by the emergent light of the lens 12 on the illuminated surface 20 will be substantially a rectangular spot, so that the user can be provided with a specific lighting effect to meet the needs of the user.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. An LED lamp light distribution system, characterized in that: the LED lamp light distribution system comprises an LED chip, a lens disposed in a light emitting direction of the LED chip, and a light reflecting device disposed in the light emitting direction of the lens, the LED chip comprising a chip optical axis, the lens comprising a lens optical axis disposed coincident with the chip optical axis, and a light source setting groove intersecting the lens optical axis, and an exit surface for receiving the outgoing light of the light source setting groove, the light source setting groove is a plane symmetrical structure, in a section along the lens optical axis and parallel to the horizontal plane, the light source setting groove comprising a first contour line, and the exit surface comprising a first exit surface contour line, the first contour line and the first exit surface contour line completing the convergence of the outgoing light of the LED chip toward the lens optical axis, on a section along the lens optical axis and perpendicular to the horizontal plane, the light source setting groove comprising a second contour line, the exit surface including a second exit surface contour line, the second contour line and the second exit surface contour line completing diffusion of the outgoing light of the LED chip away from the lens optical axis, the light reflecting device comprising a reflecting plate perpendicular to a plane formed by the second contour line and the second exit surface contour line.

2. An LED lamp light distribution system as claimed in claim 1, wherein the curvature of the first exit surface contour line is greater than the curvature of the first contour line.

3. An LED lamp light distribution system as claimed in claim 1, wherein the curvature of the second exit surface contour line is smaller than the curvature of the first contour line.

4. An LED lamp light distribution system as claimed in claim 1, wherein on a section along the lens optical axis and parallel to the horizontal plane, the second exit surface contour line comprises two curved line and an intersection line formed by the intersection of the two curved lines and intersecting the lens optical axis, this intersection line is parallel to the horizontal plane.

5. An LED lamp light distribution system as claimed in claim 1, wherein the lens takes the plane where the intersection line and the lens optical axis are located as a symmetric plane.

6. An LED lamp light distribution system as claimed in claim 1, wherein the lens takes the plane perpendicular to the intersection line and the lens optical axis as a symmetric plane.

7. An LED lamp light distribution system as claimed in claim 1, wherein on the second exit surface contour line, the diffusion angle of the second exit surface contour line gradually decreases in the direction away from the intersection line so that the light obtained in the direction away from the intersection line gradually increases.

8. An illumination system comprises at least one LED lamp light distribution system as described in claim 1 and at least one illuminated surface corresponding to the LED lamp light distribution system respectively, the illuminated surface perpendicular to the reflecting plate and the lens optical axis, on a section along the lens optical axis and parallel to the horizontal plane, the second exit surface contour line comprises two curved line and an intersection line formed by the intersection of the two curved lines and intersecting the lens optical axis, the intersection line is parallel to the horizontal plane, the boundary is the intersection line, and on a section along the lens optical axis and parallel to the horizontal plane, the emergent light of the second exit surface contour line close to the side of the reflecting plate is directed toward the reflecting plate, the reflected light of the reflecting plate overlaps with the light spot formed by the emergent light of the second exit surface contour line away from the side of the reflecting plate on the illuminated surface.

9. The illumination system as claimed in claim 8, wherein on the second exit surface contour line, the diffusion angle of the second exit surface contour line gradually decreases in the direction away from the intersection line so that the light obtained in the direction away from the intersection line gradually increases.

10. The illumination system as claimed in claim 9, wherein the side with the smaller diffusion angle is directed toward the side of the lens that is farthest from the illuminated surface.

11. An illumination system as claimed in claim 8, wherein the curvature of the first exit surface contour line is greater than the curvature of the first contour line.

12. The illumination system as claimed in claim 11, wherein on the second exit surface contour line, the diffusion angle of the second exit surface contour line gradually decreases in the direction away from the intersection line so that the light obtained in the direction away from the intersection line gradually increases.

13. The illumination system as claimed in claim 12, wherein the side with the smaller diffusion angle is directed toward the side of the lens that is farthest from the illuminated surface.

14. An illumination system as claimed in claim 8, wherein the curvature of the second exit surface contour line is smaller than the curvature of the first contour line.

15. The illumination system as claimed in claim 14, wherein on the second exit surface contour line, the diffusion angle of the second exit surface contour line gradually decreases in the direction away from the intersection line so that the light obtained in the direction away from the intersection line gradually increases.

16. The illumination system as claimed in claim 15, wherein the side with the smaller diffusion angle is directed toward the side of the lens that is farthest from the illuminated surface.

* * * * *